United States Patent [19]

Wong

[11] Patent Number: 4,637,536

[45] Date of Patent: Jan. 20, 1987

[54] PERSONAL BINOCULAR SUPPORT

[76] Inventor: Wilbur Wong, Highway Contract Rte. Box 3228, Oracle, Ariz. 85623

[21] Appl. No.: 765,878

[22] Filed: Aug. 14, 1985

[51] Int. Cl.$^4$ .............................................. A45F 3/08
[52] U.S. Cl. .................................. 224/262; 224/261; 224/909
[58] Field of Search ............... 224/909, 908, 204, 215, 224/271, 259, 270, 261, 262

[56] References Cited

U.S. PATENT DOCUMENTS

| | | | |
|---|---|---|---|
| 1,018,771 | 2/1912 | Neuburger | 224/909 X |
| 2,270,931 | 1/1942 | Corcoran | 224/909 X |
| 3,273,484 | 9/1966 | Lapsley | 224/908 X |
| 3,541,976 | 11/1970 | Rozas | 224/270 X |
| 4,033,488 | 7/1977 | Brewer | 224/261 X |
| 4,526,308 | 7/1985 | Dovey | 224/908 X |
| 4,561,578 | 12/1985 | Bell | 224/215 X |

FOREIGN PATENT DOCUMENTS

| | | |
|---|---|---|
| 1920489 | 2/1971 | Fed. Rep. of Germany ...... 224/908 |
| 2356482 | 5/1975 | Fed. Rep. of Germany ...... 224/908 |

OTHER PUBLICATIONS 16 pages of Sky & Telescope magazine.

Primary Examiner—Stephen Marcus
Assistant Examiner—Robert M. Petrik
Attorney, Agent, or Firm—Romney Golant Martin Seldon & Ashen

[57] ABSTRACT

This device holds an optical aid such as a pair of binoculars at a user's eyes, without the support of the user's arms and hands. The user applies only small upward or downward pilot force to a point on the device well below the optical aid. To change or maintain the vertical position of the optical aid the user need not even raise the hands above the chest. The device is mechanically articulated so that, guided only by the pilot force which is simply upward or downward, the optical aid can track and follow the user's head and eyes in both position and angle as the user shifts his view up and down between the horizon and the zenith. The device is attached to or worn by the user, while springs or counterbalancing support the weight from the user's torso, to free the user's arms and hands.

20 Claims, 7 Drawing Figures

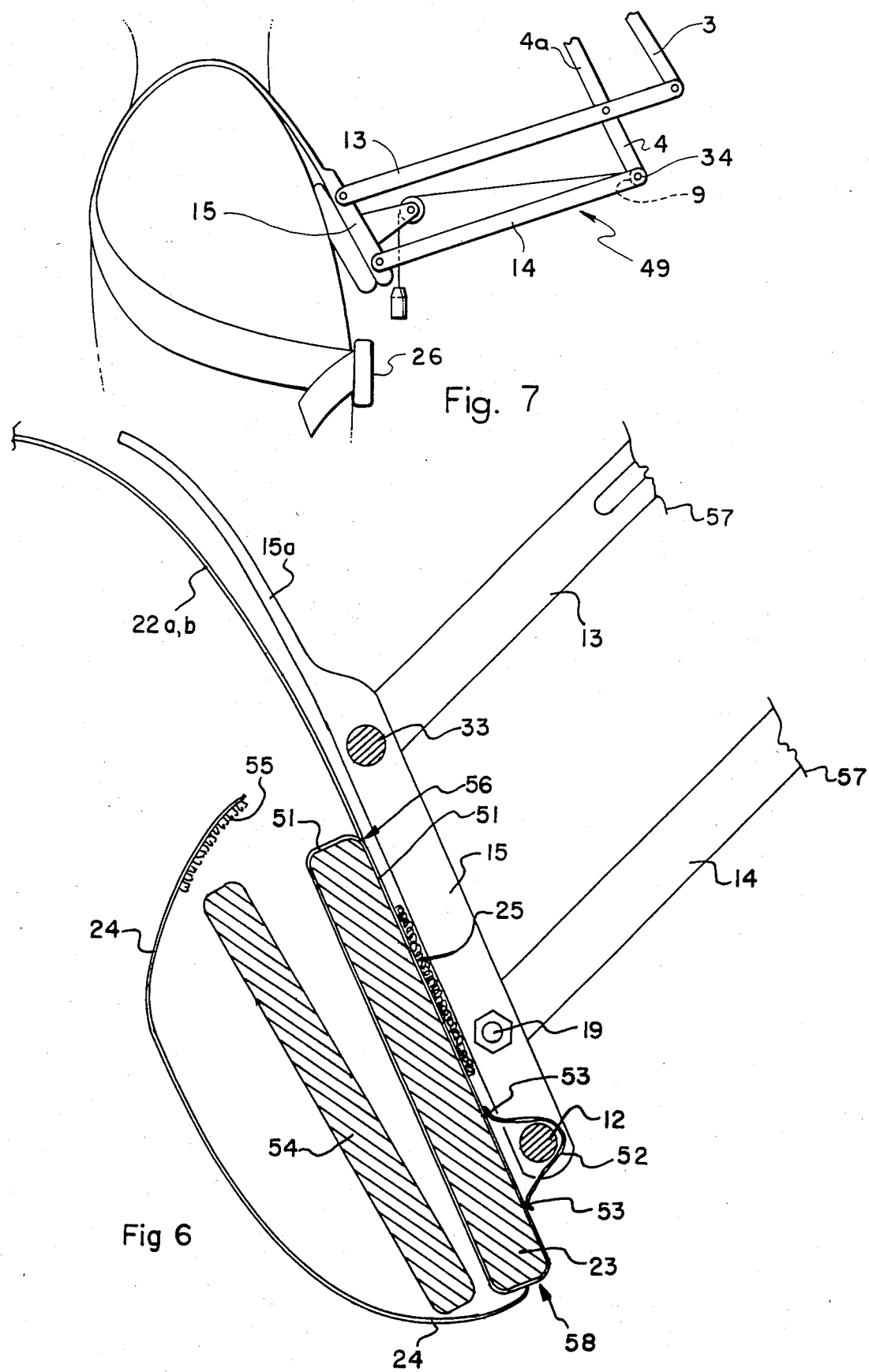

PERSONAL BINOCULAR SUPPORT

BACKGROUND OF THE INVENTION

Handheld optical aids such as binoculars are important tools which are commonly used by astronomers, hunters, bird watchers, military personnel, spectators at sporting events and dramatic or musical productions, and many other people—both amateurs and professionals. Such optical aids greatly enhance the user's optical perception by providing magnified and brighter images of the subject under study.

A significant problem in the use of such aids is the difficulty of holding them still enough, aggravated by fatigue to the user's arms and hands in protracted usage. Inability to hold optical aids steady over a period of time causes a dancing, jiggling image which largely negates the advantages offered by the improved optical image.

The problem of holding binoculars still enough for effective usage has long been recognized by astronomers. The most common method of overcoming this problem is to mount the binoculars to a common photographic tripod. While this approach solves the problem of unsteadiness, the tripod itself usually interferes with the position that the body of the user must assume when viewing objects at a angle of altitude from the horizon. Furthermore, few tripods are sufficiently tall to position binoculars high enough for a tall user, when the user is looking up from a standing position.

Accordingly the literature reveals various efforts to construct tripod attachments that mitigate the drawbacks of standard tripods. One such design, due to Steve Kufeld of Huntington Beach, Calif., is noted in the August 1979 issue of *Sky and Telescope* magazine, at pages 110 and 112.

Kufeld's device, a counterbalanced mounting atop a heavy-duty tripod, is illustrated in use by a photograph of a person sitting on a stool and looking through a pair of binoculars fixed to the mounting. Through this apparatus is apparently of considerable utility, the photograph itself shows a principal disadvantage of such devices, as the user leans forward awkwardly from the stool to bring his eyes to the appropriate distance from the fixed tripod. Presumably the stool could be moved to a better position for at least some viewing angles; however, the picture also suggests another drawback—namely, that movement of the stool (or of the user's position if standing) is required to change the vertical viewing angle.

Another tripod design aimed at overcoming this latter drawback is described by Rudolf Mandler of Deubach, West Germany, in the July 1982 issue of *Sky and Telescope* at pages 89 and 90. Mandler's tripod mount has an "inverted yoke" that carries the binoculars in such a way that "the binoculars swing in a vertical plane around a pivot at [the] neck." By virtue of this action, it is "possible to view objects all the way to the zenith without twisting [the] body." This swinging action is a very important feature of Mandler's tripod and will be discussed further below.

A less common but frequently publicized approach has been to build special chairs or chair attachments that support the binoculars through mechanical arms and brackets. Such arrangements provide more comfortable viewing positions for the user's body, particularly at higher viewing angles.

Chris Baetens, of Boechout, Belgium, offers one of the simplest of such devices, shown in the February 1985 issue of *Sky and Telescope* at page 171. His device is made from an old revolving desk chair fitted with an adjustable framework to support the user's back, as the user assumes a near-reclining position to view the stars. Casters under the entire assemblage permit the user to swivel the chair, and adjustable arms support the binoculars above the back portion.

Once the binocular support arms and the back framework are properly adjusted for the particular user's comfort and for the desired altitude angle, such a device supports the binoculars steadily, relieving the user's hands of this task. It of course offers considerable viewing satisfaction for the amount of design and construction effort invested. To change viewing angles, however, the user apparently must get up, adjust the back framework and probably the support arms as well, and then get back into the apparatus under the support arms.

John Talbot, of Camarillo, Calif., writing in the same publication at page 172, has described a system that avoids this necessity. His chair rocks for altitude variation and rotates in azimuth, permitting a good view of the sky from about twenty-five degrees of altitude to the zenith—with one stop for chair adjustment along the way.

Pearson Menoher, of Greenwich, Conn., in the January 1974 issue of *Sky and Telescope* at pages 51 through 55, discloses a more elaborate apparatus that eliminates the need for getting up and sitting back down to make adjustments. His apparatus is a motorized observing chair which tilts about a vertical axis for altitude-angle variation, and which rides a wheel-and-track suspension for azimuth variation. The azimuth system is driven by a third-horsepower electric motor. This system may represent the ultimate in investment for binocular-viewing comfort, though perhaps not the ultimate in design elegance.

Emphasizing the latter, or at least aiming to make the most of a much more modest investment in time and materials, are observing-chair designs introduced by John Riggs, of Kenmore, N.Y., and by Burt Leifer of Fort Wayne, Ind. These appear in *Sky and Telescope* for, respectively, February 1981 (pages 162 through 164) and May 1979 (pages 487 and 488).

Each of these two approaches provides a chair with a simple azimuthal pivot about a vertical axis, and more importantly (as will be seen) a vertical swinging action for the binoculars themselves about a horizontal axis that is generally adjacent to the user's neck.

Most of the tripods and chair brackets discussed above are difficult to adjust when changing viewing angles. These devices frequently require several separate adjustments to obtain the right position in both height and angle. The Mandler tripod and the Riggs and Leifer chairs minimize these problems by the swinging action of the binoculars about axes adjacent to the viewer's neck.

To understand this advantage, it is necessary to refer to the physiology of a typical viewer in scanning vertically over large angles of altitude. Generally, viewing seems to be most comfortable when the eyes are directed roughly "straight ahead" in relation to the head. There is a slight range of eye travel within which a person can comfortably view objects above or below a normal straight line of sight, relative to the person's head, but the principal way of shifting the direction of one's gaze by large angles is to move the head itself. For comfortable protracted viewing, therefore, it is necessary to allow for shifting of the head: translational and rotational movements naturally accompany rotation of a person's direction of view.

The multiple-adjustment problem mentioned above, as recognized by Mandler, Riggs, Leifer and others, arises from these translational and rotational movements. These natural movements of a person's head cause the eye position to traverse an arc when the head moves between a horizontal and an elevated viewing position. For present purposes this arc may be regarded as very roughly circular, with an apparent or effective center of motion that is near the person's neck.

Thus both Mandler's tripod-attachment "yoke" and the binocular-supporting "fork" of Riggs' and Leifer's chairs pivot about axes adjacent the user's neck. The location of the pivot axis relative to the user's body is discussed explicitly by both Riggs and Leifer. In each case the binocular eyepiece, being fixed to the yoke or fork, revolves about the same respective axis. As shown in Mandler's illustrations, however, the line of sight itself—that is, the centerline of the ocular—preferably does not pass through that mechanical-rotation axis.

There remain several problems, however, with the inverted "yoke" or "fork" designs of Mandler, Riggs and Leifer.

First, the viewer must remain in a fixed position with respect to the mechanical-rotation axis of the yoke or fork. In other words, the viewer must stand in essentially the same spot continuously to use Mandler's tripod; or he must sit in essentially the same spot in Riggs' or Leifer's chair. He must be in the same position relative to the rotation axis, or his line of vision will not comfortably align with the centerlines of the oculars. After a time these requirements lead to a certain amount of discomfort. In effect the viewer becomes saddle-sore.

Second, in the design of these three swinging-mount systems the translational and rotational movements of the user's head are not only accommodated (which is desirable), but are actually *required* to supply *all* of the vertical variation in angle of view. This requirement is not desirable, because it means that to view parts of the sky near the zenith either the entire chair must tilt (as in Menoher's elaborate device) or the user's head must be tilted far back relative to his torso. The uncomfortable neck angle that results is quite plainly depicted in the photograph at page 163 of the Riggs presentation in *Sky and Telescope,* and is piquantly confirmed by the author's comments about the importance of his headrest.

Third, in each of the Riggs and Leifer chairs, the positioning of the binocular-mount rotation axis relative to the body of the chair must be tailored to the personal dimensions of the individual who will use the chair. Thus Riggs says:

I eventually found the axis position ideal for my eye. Careful measurements were then transferred to the layout of the inverted fork that carries the telescope, and to the layout of the large triangular seat box.

Leifer refers to earlier comment thus:

Leslie Peltier has pointed out that the axis of movement of his head up and down is in line with his ears. Glenn found that his axis was 1¾" below the ear opening. Each observer will have to determine this point before beginning construction.

Fourth, the swinging-arm mounts in the Mandler, Riggs and Leifer devices all require the positioning of the swinging structure at the sides of the user's head. As the user tilts his head up and down, he always hand-adjusts the swinging structure up and down too; thus it remains at the sides of his head. This swinging structure of course also has a crossbar, carrying the binoculars. The crossbar passes all the way across his field of peripheral vision—*not only* across the user's *face* as such, but across the entire distance between the swinging-structure elements at both sides. The user moves this crossbar too so that it tracks his head movements and is always across both sides of his peripheral field of view.

Although of course the device is used generally in darkness, nonetheless there will remain for many users a continuing sensation of being enclosed or even confined. The crossbar and the swinging-structure side elements together form a moving cage, always occupying both sides of the user's peripheral vision. In other words, these tend toward the claustrophobic. This tendency is badly aggravated by the requirement that while viewing the user keep his body in practically the same position relative to the tripod or chair.

Fifth and finally, all of the tripod and chair-bracket systems—even those of Mandler, Riggs and Leifer—are limiting in that their size and in some cases their weight inhibit the user's freedom of movement.

OBJECTS OF THE INVENTION

It is an object of this invention to provide improved support and positioning of optical aids such as binoculars at any viewing position arbitrarily desired by the user, preferably without the need for support by the user's arms and hands.

Another object is to permit the user to shift his body position freely while viewing—whether sitting or standing—so that the viewer is not required to sit or stand in a particular position.

Another object is to permit the user to use his natural eye movements to provide some of the variation of vertical viewing angle, rather than demanding that his neck do the whole job. This object, it must be said, very literally avoids a pain in the neck.

Another object is to provide support with relatively compact, narrow apparatus disposed almost entirely in front of the user—with little or no obstruction of the peripheral vision at either side—so that there is minimal tendency toward a sensation of confinement.

Another object is to free the user from reliance on stationary support apparatus. In other words, it is an object of the invention to allow the user to stand up, walk around, sit down in different places, and so forth—all during an essentially continuous viewing session.

Yet another object of this invention is to allow the optical aid to be stored in a convenient location away from the user's eyes, while keeping it immediately available for use.

BRIEF SUMMARY OF THE DISCLOSURE

My invention is a personal optical-aid holder for supporting an optical aid in relation to the body of a user, during use. It includes a base, and some means for securing the base to the user's body. For the purpose of generality in defining my invention, I will refer to these latter means as the "base-securing means." The invention also includes a platform that is adapted to receive and hold the optical aid.

The invention also includes a mechanical linkage that interconnects the platform and the base, and that positions the platform in relation to the base. By virtue of this interconnection and positioning, the linkage substantially supports the optical aid in viewing positions that are substantially at the user's eyes.

The linkage is adapted for easy control by the user, without the user's raising his or her hands to the viewing positions of the optical aid.

The linkage is geometrically arranged to translate and rotate the optical aid vertically, under manipulation by the user, to substantially follow movement of the user's head and eyes in scanning upwardly from the horizon. The linkage performs this tracking function, as well as the support function, even though the user guides it only by small pilot forces which are directed simply upward or downward.

In preferred forms of my invention, the linkage causes the eyepiece of the optical aid to move in an arc that is at least roughly circular, under manipulation by the user. The arc is at least roughly centered about an axis that is fixed in relation to the user's torso. Preferably the base is at least approximately aligned with this axis.

I prefer to arrange the linkage geometrically to substantially follow movement of the user's eye position as the user's head is tilted backward at least sixty-five degrees from a normal horizon-viewing condition, and advantageously eighty degrees or more.

It is also preferable to geometrically arrange the linkage to *point* the optical aid at an angle that increases from zero to very approximately six or seven degrees, as the user's head is tilted backward about fifty-five degrees—and advantageously to very approximately fifteen degrees as the user's head is tilted backward about seventy-five or eighty degrees. The "angle" that is mentioned in the immediately preceding sentence is defined in relation to the "straight ahead" direction from the user's head.

By combination of the two preferable features just mentioned, my invention increases the viewing direction, relative to the horizon, from zero to about sixty-three degrees as the user's head tilts backward about fifty-five degrees from a normal horizon-viewing condition—and advantageously to about ninety or ninety-five degrees as the user's head tilts backward about seventy-five or eighty degrees.

Preferably the linkage includes some means for generating an arc motion. I will refer to these means as "arc-motion generating means." They include at least one arm, one of whose ends is pivotally secured to the base. With this arrangement, the *other* end of the arm undergoes an arc motion. The linkage also includes some means for conveying to the platform, and to the eyepiece, at least some part of this arc motion; I will refer to these means as the "arc-motion conveying means."

Preferably the arc-motion generating means also include a second arm pivotally secured to the base, and a driving arm pivotally secured to the two base-secured arms. The base, driving arm and base-secured arms are dimensioned and arranged to form a parallelogram. The arc-motion conveying means include an extension of the driving arm beyond the parallelogram. The extension is pivotally secured to the platform, at a pivot point on the platform.

Advantageously the pivot point moves along a path that substantially duplicates the arc motion of the "other" end of the first-mentioned arm, but displaced by the length of the extension. In this way the arc motion of the other end of the first-mentioned arm is conveyed and imparted to the pivot point on the platform.

In addition the arc-motion conveying means advantageously include an extension of either of the base-secured arms beyond the parallelogram, and a control arm that is pivotally secured to the extension and to a second pivot point on the platform. This control arm controls the angle of the platform relative to the driving-arm extension. I prefer to make the distance between the two pivot points on the platform shorter than the base-secured-arm extension, so that the platform rotates more rapidly than the base-secured arms: this extra rotation provides the previously mentioned additional "pointing" angle relative to the user's "straight ahead" viewing direction.

The linkage preferably folds downwardly from a horiozon-viewing position carrying the optical aid into a storage position.

The invention also preferably includes some means for substantially bearing the combined weight of the platform, the linkage, and the optical aid, when the aid is in the viewing positions. These "weight-bearing means" preferably include a biasing device such as a spring or a sealed gas cylinder, but may instead include a counterbalance mechanism. (As will be understood, a biasing device is more compact and light than a counterbalance mechanism, though a counterbalance may pose slightly less risk in event of breakage.)

My invention's linkage-and-base configuration makes it possible to minimize the claustrophobic effect mentioned earlier. It is preferable to take maximum advantage of this potential by securing the base to the user's chest and making the entire holder substantially narrower than the user's shoulders. The base-securing means are preferably a cushion that rests against the user's chest, and a harness that passes over the user's shoulders.

It is entirely feasible, in fact, to make the entire holder except for the harness about the width of user's head. Advantageously all of the holder except for the harness is disposed in front of the user; and no part of the holder is adjacent to the user's head near the height of the user's eyes. Hence the apparatus is not within either side of the user's peripheral vision at all.

The foregoing operational principles and advantages of the present invention will be more fully appreciated upon consideration of the following detailed description, with reference to the appended drawings, of which:

BRIEF DESCRIPTION OF THE DRAWINGS

FIG. 6 is an enlarged side elevation, partly in section, showing details of the base and base-securing means of the same embodiment.

FIG. 7 is a somewhat schematic side elevation, drawn to be generally consistent with FIG. 2, illustrating a slightly different embodiment of my invention.

DETAILED DESCRIPTION OF THE PREFERRED EMBODIMENTS

Figure 1:
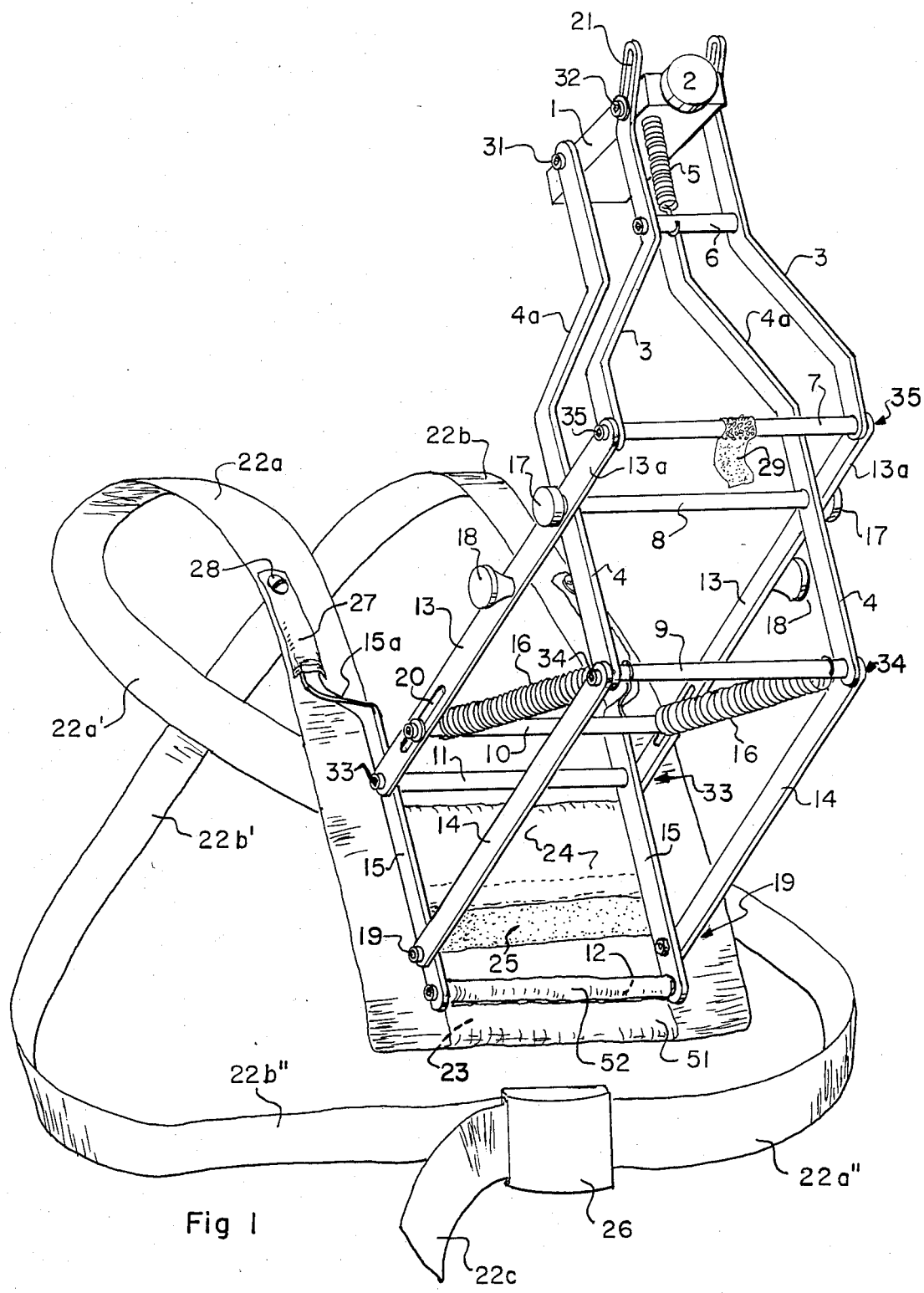
FIG. 1 is a perspective drawing of a preferred form of my invention.
Figure 3:
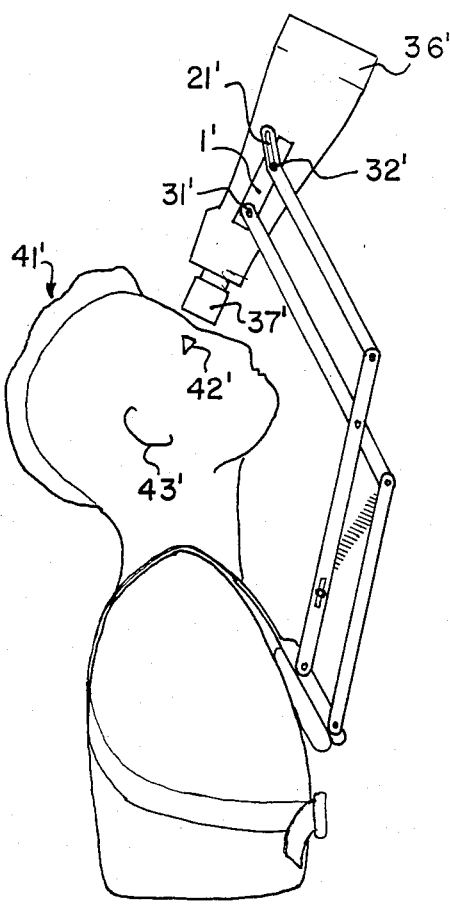
FIG. 3 is a similar view showing the same embodiment supporting a pair of binoculars, and secured to and in use by a person looking upward.
Figure 2:
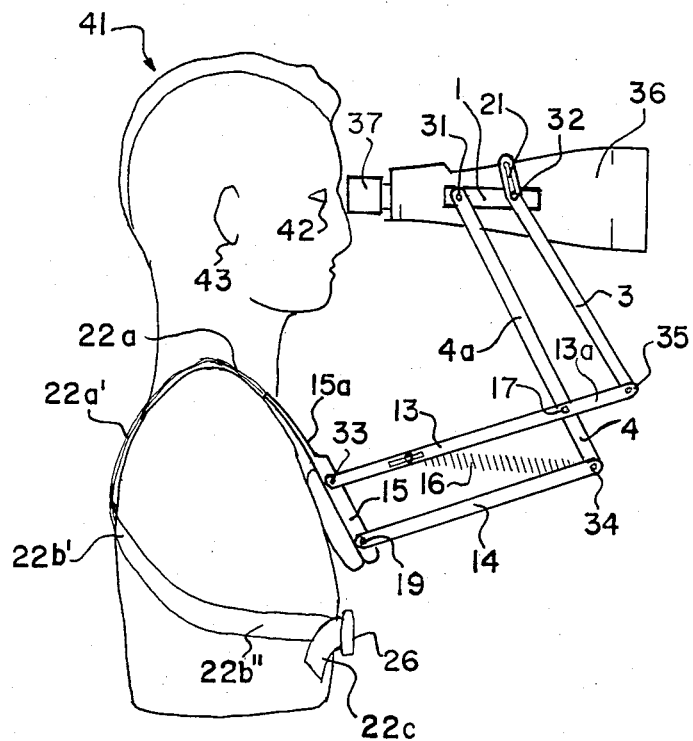
FIG. 2 is a side elevation showing the FIG. 1 embodiment of my invention supporting a pair of binoculars, and secured to and in use by a person looking toward the horizon.

As shown in FIGS. 1 through 3, a preferred form of my invention has a platform 1 for support of a pair of binoculars or the like 36. The platform 1 is connected by pivoting joints 32 and 31 respectively to control arms 3 and driving-arm extensions 4a—each of which is in pairs, there being one of each in left and right components. The driving-arm extensions 4a are extensions of the driving arms 4, which are in turn connected through pivoting joints 17 and and 34 respectively to arms 13 and 14. The control arms 3 are similarly connected to base-secured arm extensions 13a, which are extensions of the upper base-secured arms 13. The pairs of base-secured arms 13 and 14 in turn are connected through pivoting joints 33 and 19 respectively to supporting members 15—of which there are a pair, there being one left and one right member.

The spacing of these pairs of arms and members is maintained by the platform 1, and by lateral connecting rods. Specifically, two rods 6 and 7 space apart the control arms 3, and two other rods 8 and 9 space apart the driving arms 4. Four other lateral rods 7, 8, 10 and 11 space apart the upper base-secured arms 13 and their extensions 13a, and two other rods 9 and 12 space the lower base-secured arms 14. Two of these rods 11 and 12, already mentioned, likewise space the base members 15.

At the four junctions between (1) the control arms 3 and the base-secured-arm extensions 13a, (2) the driving arms 4 and the upper base-secured arms 13, (3) the driving arms 4 and the lower base-secured arms 14, and (4) the base-secured arms 13 and the base members 15, four pairs of screws 35, 17, 34 and 33 respectively pass through the arms and members and are threaded into the lateral connecting rods. These screws thus secure the two sides of the linkage in the spaced-apart condition, and also act as axles to allow the pivoting motions of these respective pairs of linkage members.

The base members 15, together with the lateral rods 11 and 12 between them, form a base 11-12-15 upon which all the other arms are supported; yet the arms are allowed to pivot in a prescribed motion. At the junction between the lower base-secured arms 14 and the base members 15, two additional screws 19 rotatably connect the lower base-secured arms 14 to the base 11-12-15.

The base-secured arms 13 and 14, the driving arms 4, and the base members 15 form a parallelogram, which is allowed to open and close by pivoting of the base-secured arms 14 and 13 about their pivot points 33 and 19 with the base 11-12-15. The pivoting action of this parallelogram causes the pivot point 31 where the driving-arm extension 4a connects to the platform 1 to move in an arc. This arc is identical to that described by the axle 17 where the driving arm 4 intersects the upper base-secured arm 13—but is displaced parallel to the base members 15 by the length of the driving-arm extension 4a.

The arc of motion which is thus traced by the rearward pivot point 31 of the platform 1 has a center that is in the plane of the base 11-12-15 but similarly displaced beyond the parallelogram by the length of the driving-arm extension 4a.

As shown in FIG. 2, the linkage is arranged so that it can support the optical aid in a horizontal viewing position 36, with the ocular 37 directly in front of the user's eyes. (Mounting of the device to the user's torso will be described in detail shortly.) Due to the arc of motion mentioned just above, as the parallelogram is folded upward into a relatively closed condition the platform rearward pivot point 31 of FIG. 3 revolves upwardly and backwardly over the user's head to a new position 31' of FIG. 3. Likewise the optical aid is swung upwardly and backwardly above the user's head to an elevated viewing position 36'.

As also shown in FIGS. 2 and 3, if the user's head is moved from a horizon-viewing position 41 as in FIG. 2 to an elevated viewing position 41' as in FIG. 3—so that the user's eyes move from the position 42 of FIG. 2 to the position 42' of FIG. 3—the elevated ocular at 37' is found to be in correct alignment with the upraised eyes at 42' for viewing at essentially any angle of altitude from zero to at least fifty-five or sixty degrees.

This alignment is optimized by placing the center of rotation of the platform rearward pivot point 31, 31' at the center of the arc described by the position of a user's eyes 42, 42' (FIGS. 2 and 3) as the user moves his head from a position 41 of looking at the horizon to a position 41' of looking at an elevated angle.

Figure 5:
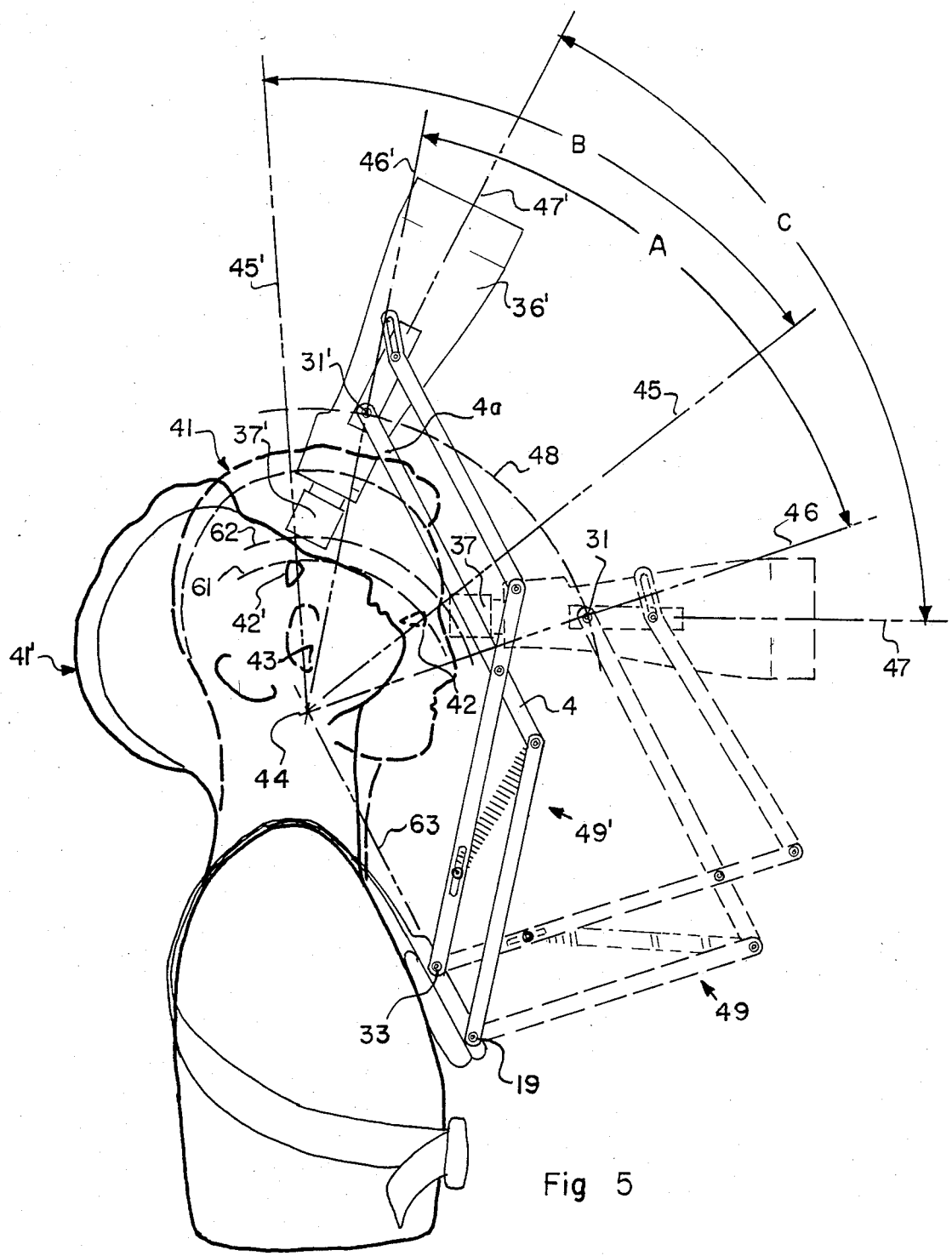
FIG. 5 is a diagram formed as a composite of FIGS. 2 and 3, and showing certain geometrical relationships involved in operation of the FIG. 1 embodiment.

FIG. 5 illustrates the geometrical relationships involved. Dashed lines in FIG. 5 represent the horizon-viewing positions (that is to say, the FIG. 2 position) of the user's head 41 and eyes 42, the linkage 49 generally, and the binoculars 36. Solid lines in FIG. 5 represent the elevated viewing positions (the FIG. 3 position) of the user's head 41' and eyes 42', the linkage 49' generally, and the binoculars 36'.

The platform rearward pivot point 31, 31' moves in an arc 48 that is centered at point 44. This point 44 is aligned with the base 11-12-15—which is to say, it is along the line 63 defined by the two base pivot points 33 and 19—but displaced beyond the parallelogram along that line 63 by a distance equal to the length of the driving-arm extension 4a.

The user's eyes 42, 42' also move along an approximately circular arc 61 that is roughly fixed with respect to the user's body. As mentioned in the prior-art discussion the location of the effective center of the eye-movement arc 61 varies with the individual, but as an example is typically found roughly two inches below the position 43 of the bottom of the user's ears when the head is in the horizon-viewing position 41.

When my invention is properly adjusted the center 44 of the arc 48 described by the platform rearward pivot point 31, 31' is placed at the effective center of the arc 61 described by the user's eyes 42, 42'—wherever that may be for the particular individual user. In FIG. 5 it is shown as described for the typical example above. Thus the point 44 in the diagram represents the centers of both arcs 61 and 48.

Now referring again to FIGS. 2 and 3, it will be noted that the base-secured arm extension 13a is longer than the distance between the two pivot points 31 and 32 on the platform 1. This difference in spacing causes the platform 1 to rotate through greater incremental angles than the corresponding incremental angles at the junctions 33 or 19 between the base-secured arms 13 or 14 and the base members 15. It is this higher rate of rotation that produces the added "pointing" angle mentioned earlier, taking advantage of the user's eye-movement ability. This geometrical relationship too is illustrated in FIG. 5. To see the shift, note that (1) the difference in elevation angle of the user's head 41, 41' for the two illustrated positions is the angle B between lines 45 and 45'—radii drawn from the center point 44 through the user's eyes at 42 and 42' respectively; while (2) the difference in elevation angle of the optical aid is the angle C between the optical-aid centerline positions 47 and 47'. (It is assumed here that the linkage position is angled to match the tilt of the user's head.) As can be seen, the angle C through which the optical-aid centerline moves is larger than the angle B through which the user's head moves.

More specifically, as seen in FIG. 5 the user's head (and with it the user's "straight ahead" viewing direction) is tilted upward and backward somewhat more than fifty-six degrees (angle B), while the binoculars are elevated more than sixty-three degrees (angle C) from the horizontal.

It may be noted that these two numbers are equivalent to an average of 1.13 degrees of incremental binocular elevation per degree of incremental head elevation. As the user's head is tilted further, however, for the most highly preferred embodiments of my invention the rate at which the binoculars are elevated actually accelerates. In particular, another twenty-four degrees of head movement produces an additional thirty-two to thirty-three degrees of binocular elevation—an *average* of 1.33 to 1.38 degrees of binocular elevation per degree of head elevation.

This shift of "pointing" angle relative to the user's head takes advantage of the user's ability to move her or his eyes by ten to fifteen degrees. Consequently the neck is not called upon to do the entire job of accommodating different viewing angles. In particular, from the foregoing discussion it can be seen that within the first fifty-six degrees of head movement the binoculars *gain* about seven degrees, and in the following twenty-four degrees of head movement the binoculars gain an additional eight or nine degrees for a total of about fifteen to sixteen degrees. Thus the system allows a user to look toward and even past the zenith, while tilting the head back only about seventy-five degrees.

I prefer to provide this accelerating operation because in the range of most normal viewing angles—below about sixty degrees—the departure of the viewing direction from the "straight ahead" direction is so small as to be completely comfortable, and indeed virtually unnoticeable. Thus the user's enjoyment in protracted viewing is not impaired by even slightly fatiguing muscle tension within the eye, that could otherwise result from far-off-axis viewing. Yet the eye muscles can be brought into play to share with the neck muscles any tendency toward fatigue that may occur in viewing at extremely high angles of altitude.

It will be understood that viewing angles are subject to reorientation of the user's torso—as by the user's bending backward while standing, or leaning backward against the back of a chair, to increase the angle by which the head is tilted relative to the horizon-viewing position. One of the objects of my invention, as earlier noted, is to free the user from the *requirement* of sitting in a particular position in a particular chair—or from standing in a particular position at a particular tripod apparatus. Nonetheless when using my invention the user has the *option* of sitting or even lying down while viewing. In exploiting this freedom the user may use any convenient chair, couch, bed, lawn, beach, etc., and may move from one to another during the course of a viewing session.

The line 46 in FIG. 5 represents the radius from the center point 44 through the platform rearward pivot point 31, in the horizon-viewing condition of the apparatus. This line defines with the analogous line 46' in the elevated condition of the apparatus an angle A, which represents the angle through which the platform rear pivot point 31 in FIG. 5 has revolved about the effective center point 44 of the user's eye-motion arc.

From the earlier description of the linkage it will be understood that the angle A therefore is equal to the angle through which each of the base-secured arms 13, 14 rotates, in moving the binoculars through the angle B. As may be seen from FIG. 5, this angle B of parallelogram deformation—relative to the horizon-viewing condition—is about sixty degrees—intermediate to the previously mentioned fifty-six degrees of head tilt and sixty-three degrees of binocular motion. This value of about sixty degrees is merely mentioned for completeness of description.

From the preceding discussion it may be noted that the ocular moves in an arc 62 that cannot be perfectly circular, though the platform rearward pivot point 31 moves in a circular arc 48. The tilting action of the mechanism deforms (flattens) the locus 62 of the ocular. Practically speaking, however, the arc 62 followed by the ocular matches the arc 61 followed by the user's eyes sufficiently well, and the deformation just mentioned is inconsequential—generally within about one-eighth to three-sixteenths inch at the eyes. This tiny displacement is easily accommodated by the user, through natural flexibility in extension of the neck, or by hitching the entire mechanism up or down very slightly relative to the torso.

As discussed earlier the base-secured arm extension 13a should be longer than the interpivot distance at the platform, to provide the relatively faster rotation of the platform. The ideal length of the extension 13a, relative to the interpivot distance of the platform 1, depends upon the amount of relative rotation desired, and also upon the distance of the platform pivot (or control point) 32 from the upper base-secured arm 13.

The length of the control arm 3, however, is simply chosen to bring the optical centerline of the binoculars to the horizontal position 47 when the linkage is in the horizon-viewing condition. Thus the desired lengths of both the extension 13a and the control arm 3 can be found within a few iterations, to give whatever rotational gain is desired. As seen from the drawings, to level the binoculars in the horizon-viewing condition of this preferred embodiment of my invention, I make the control arm 3 substantially shorter than the driving-arm extension 4a.

From the two preceding paragraphs it should thus be noted that (1) the interpivot distance on the platform 1 is shorter than the base-secured arm extension 13a, and (2) the control arm 3 is shorter than the driving-arm extension 4a. The significance of these two facts will be shown later.

It may also be noted that the control arm 3 alternatively can be driven from an extension (not illustrated) of the *lower* base-secured arm 14 rather than an extension 13a of the upper base-secured arm 13 as shown. To effect such a modification it will be preferable to make the extension longer than the illustrated extension 13a, since the angular effect on the platform 1 will be smaller in proportion to the greater distance from the control point 32 to the lower base-secured arm 14.

In the accompanying drawings the optical centerline 47 and the centerline of the platform 1 are represented as coincident. In the case of some monoculars or small telescopes this relationship may actually obtain. Most binoculars that are used by amateur astronomers, however, have a tapped hole for use in tripod mounting; this tripod mount is ideal for attachment of the platform 1 of my invention, by means of a threaded mounting rod (with a handle 2, FIG. 1) passing through the platform 1. Since the tripod-mount hole is *above* the optical centerline, however, in principle the threaded mounting rod (not shown) should be offset upwardly from the plane of the two pivot axes 31, 32 (FIG. 1)—so that the optical centerline of the mounted binoculars is at that plane 31, 32.

To be more specific, the tripod-mount hole of most binoculars is typically aligned with the focusing knob, which—in the familiar configuration of virtually all commercial binoculars—is of course on the same shaft that is used as a pivot for varying the interocular distance to suit the distance between the user's eyes. Consequently the actual distance from the tripod-mount hole to the optical centerline varies with the interocular distance, which in turn varies from user to user.

To compensate for this variable offset distance, therefore, in principle the platform 1 should actually be in two pieces, one piece generally in the position shown in the drawings for the platform 1 and the other piece (not illustrated) carrying the threaded rod and handle. The distance between the two pieces should in principle be adjustable, so that the user can bring the optical centerline of the binoculars into alignment with the plane of the two pivot axes 31 and 32 (FIG. 1).

Although the offset distance, and its adjustment, mentioned in the immediately preceding paragraphs are necessary in principle, I have not provided them in the prototypes that I have made. The prototypes nevertheless have been found quite satisfactory, and it may be that most or all users are able to accommodate the offset by adjustment of the overall device relative to the torso—together with the natural flexibility of the neck. A "deluxe" embodiment of my invention, however, could well provide an offset between the threaded mounting rod and the plane of the pivots 31, 32; and if desired this offset distance could be made adjustable. For simplicity of the drawings, the variable distance from platform to optical centerline has been disregarded.

The linkage of course has a tendency to move downwardly under the influence of gravity. The considerable weight of the optical aid 36 mounted upon the platform 1 is added to the weight of the linkage itself. To counteract this tendency, tension springs 16 are attached between two of the lateral connecting rods 9 and 10 to bias the arms upwardly. One of these connecting rods 10, which also functions as one connecting point for the springs 16, is mounted by screws in respective slots 20 in the arms 13. The slots allow for adjustment of the tension in the springs 16, thus permitting compensation for the various weights of optical aids that may be mounted to the platform 1.

In any particular position of the linkage, either the upward force of the springs slightly exceeds the downward force of gravity, or vice versa; hence there is virtually always a small residual upward or downward force. Despite such residuals, however, static friction in the mechanism tends to keep the apparatus in any position where the user places it. Therefore as a practical matter it is not necessary to try to make the compensation exact.

Although the biasing means in this preferred embodiment are tension springs between the two connecting rods 9 and 10, the biasing means instead may be wound-wire springs, elastic bands, or hydraulic or pneumatic cylinders.

Also in lieu of tensioned biasing means, compressive biasing means—such as compression springs—may be used to counteract the weight of the attached optical aid. These could be attached between the connecting rods 8 and 12 to effect the same upward biasing, and may be wound-wire, hydraulic or pneumatic devices.

Likewise, torsional springs may be used about any axle of any two arms, arranged so that the torsion causes those two arms to rotate toward their relative position that corresponds to elevation of the platform.

As previously mentioned, counterbalancing systems are also possible within the scope of my invention. For example, a pair of pulleys may be mounted to the base 15 near the upper base-secured arm 13, or to the base extension 15*a*, and a pair of cables run from the connecting rod 9 over the pulleys to suspend a weight hanging in front of the user's torso (FIG. 7). To minimize the variation in the position of the weight relative to the torso, over the operating range of the linkage, a block-and-tackle arrangement could be used—though this would require a larger weight.

Handles 18 are provided for convenient purchase by the user when the user desires to move the arms and the optical aid to a different viewing angle.

Thumb screws 17 are provided to allow the position of the arms to be locked in any arbitrarily selected position, should the user desire to hold a given viewing position for a protracted period.

To allow a convenient storage position of the optical aid, slots 21 are provided in the tops of the control arms 3. The necessity for these slots 21 will now be explained. The sum of (1) the distance between the pivot points 31 and 32 of platform 1 and (2) the length of each control arm 3 is shorter than the sum of (3) the length of a driving-arm extension 4*a* and (4) the length of a base-secured arm extension 13*a*. This inequality arises from the dimensioning that provides the "pointing" feature described earlier, but if not relieved would prevent the arms and the platform from folding substantially flat against the base.

Figure 4:
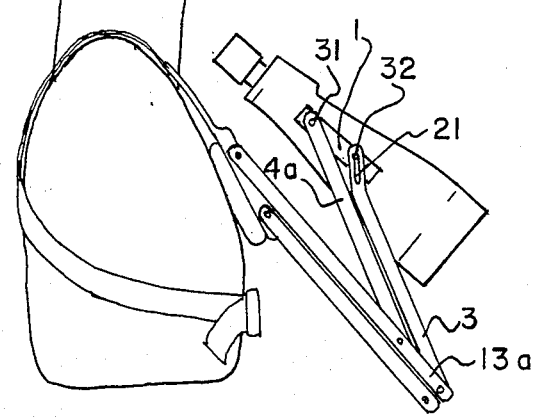
FIG. 4 is a similar view showing the same embodiment supporting a pair of binoculars, and secured to a person but folded downwardly into a storage condition.

The slots 21, however, allow the effective lengths of the control arms 3 to elongate, thereby allowing the entire linkage with the attached optical aid to fold substantially flat against the base, as in FIG. 4.

A spring 5 (FIG. 1) is connected between the platform 1 and the upper lateral rod 6 between the control arms 3. This spring 5 constrains the platform 1 to pivot at the bottom of the slot 21 when the linkage is raised into the operating range of movement. When the linkage is folded downwardly, however, this spring stretches to permit the necessary effective elongation of the control arms.

To obtain and verify the details of performance mentioned earlier, I have done graphical analysis of the linkage, and I have also had done for me some mathematical modeling of its operation. Based on these analyses, optimum operation—particularly including the acceleration of the "pointing" angle with increasing head tilt—appears to be obtained by making the base-secured arms 13 and 14 each approximately 9.2 inches long, the driving arm extension 4a approximately 8.8 inches long, the control arm 3 approximately 8.3 inches long, the base-secured arm extension 13a approximately 2.5 inches long, and the distance between the two pivot points on the platform approximately 2.1 inches.

The lengths of the driving arm 4 and the base 15—as measured between the pivots 33 and 19—may vary considerably, since their function is simply to maintain the linkage in the form of a parallelogram so that the driving-arm extension 4a is parallel to the base 15 and base extension 15a. As will be recalled, this condition is required if the platform rear pivot 31 is to duplicate the circular arc motion of the pivot point 17. Hence I prefer to make the driving arm 4 the same length as the base 15.

The platform 1 and the lateral connecting rods 6 through 12 preferably should be long enough to give adequate lateral stability while avoiding encroachment into the user's peripheral vision. As will be recalled this is significant in avoiding claustrophobic effects of use. It is extremely easy to meet these preferred conditions: in my prototypes I have made the platform 1 and shorter rod 6 approximately 1.75 inches long, and the longer rods 7 through 12 approximately five inches long. Thus the entire mechanism is narrower than the typical width of an adult's head, and the portion of the mechanism that is in the vicinity of the user's eyes is actually narrower than the distance between the eyes. The portion near the user's eyes is actually considerably narrower than the binoculars, so that there is absolutely no interference with the sides of the peripheral field—other than that by the binoculars themselves.

While I prefer to make the mechanism as narrow as indicated just above, the intrusion into peripheral vision would yet be entirely minimal if the transverse dimension of the base 11-12-15 were eight or even twelve inches, the connecting rods 7 through 9 were seven to eight inches, and the platform 1 and short connecting rod 6 were perhaps five inches—taking into account the desirability of that part of the apparatus fitting between the two halves of the binoculars.

It will be understood that the foregoing detailed specifications are only for the purpose of defining one embodiment of my invention that does in fact function, and that in fact performs very well. It is not, strictly speaking, necessary even to maintain the lower stage 4-13-14-15 of the linkage in the form of a parallelogram; it may very well be that other arrangements of arms could work equally well or even better, given appropriate compensation in the upper stage 1-3-4-13a of the linkage.

It is also possible that a linkage having an entirely different configuration could be satisfactory, provided that it interconnects the platform and the base, and positions the platform in relation to the base, so as to substantially support the optical aid in viewing positions substantially at the user's eyes—and provided that under manipulation by the user it translates and rotates the optical aid to substantially follow movement of the user's head and eyes in scanning upwardly from the horizon.

A small strap of webbing 29 (FIG. 1) with a hook-and-pile or other type of fastener may be attached between connecting rods 7 and 9 while the arms and platform are in the storage position, to prevent the linkage from opening to viewing position until the user so desires.

The supporting base 11-12-15 is attached to a harness of webbing 22a, 22b (FIG. 6) and a cushion 58. The cushion, made of padding 23 covered with fabric 51, is attached to connecting rod 12 with a tunnel of fabric 52 sewn along lines 53 to the cushion 58. The lowest spacer rod 12 passes through this fabric tunnel 52. The upper part of the harness 22a, 22b is sewn at 56 to the cushion-covering fabric 51.

The upper part of the harness 22a, 22b also is attached to the base members 15: the upward extensions 15a of the base members are inserted into tunnels of fabric 27 (FIG. 1) sewn to the harness 22a, 22b and secured with screws and nuts 28.

The harness itself consists of two straps 22a and 22b and a release buckle 26. One webbing strap 22a, attached to the right side (as viewed from the user's position) of the base 11-12-15, passes over the user's right shoulder, across the user's back as at 22a', under the arms to the front of the chest as at 22a'', and through the release buckle 26. The other webbing strap 22b passes over the left shoulder, across the user's back as at 22b', to the front of the chest as at 22b''—where it is fixed to the buckle 26.

The harness 22a, 22b including the buckle 26, permits adjustment of the webbing length to accommodate wearers of different girth. A flap of fabric 24 (FIG. 6) is attached at the bottom of the cushion 58, and passes behind and over the top of the cushion 58 to the front of the cushion, and then downward where it is secured as by a hook-and-pile fastener 25, 55. This flap 24 allows for varying amounts of additional padding to be placed behind the cushion 58 to accommodate various chest dimensions.

It is to be understood that all of the foregoing detailed descriptions are by way of example only, and not to be taken as limiting the scope of my invention—which is expressed only in the appended claims.

I claim:

1. A personal optical-aid holder for suporting an optical aid in relation to the body of a user, during use, comprising:
    a base;
    means for securing the base to, and supporting the base from, such user's torso exclusively;
    a platform adapted to receive and hold such optical aid;
    a mechanical linkage interconnecting the platform and the base, and positioning the platform in relation to the base, so as to substantially support such received and held optical aid in viewing positions substantially at such user's eyes;
    the linkage being adapted for easy control by such user, without such user's raising his or her hands to the viewing positions of such optical aid; and
    the linkage being geometrically arranged to translate and rotate such optical aid vertically, under substantially continuous manipulation by such user, to substantially follow movement of such user's head and eyes in scanning upwardly from the horizon.

2. The holder of claim 1, for use with such optical aid that has an eyepiece, and wherein:
    the linkage causes such eyepiece to move in an arc that is at least roughly circular, under manipulation by such user; and
    in use the arc is at least roughly centered about an axis that is fixed in relation to such user's torso.

3. The holder of claim 2, wherein:

the axis is roughly two inches below the position assumed by the bottoms of such user's ears when such user is looking toward the horizon.

4. The holder of claim 1, for use with such optical aid that has an eyepiece, and wherein the linkage causes such eyepiece to move in an arc that is at least roughly circular, under manipulation by such user;

in use the arc is at least roughly centered about an axis that is fixed in relation to such user's torso; and in use the base is at least approximately aligned with the axis.

5. The holder of claim 1, wherein:

the linkage is geometrically arranged to substantially follow, under manipulation by such user, movement of such user's eye position as such user's head is tilted backward at least fifty-five degrees from a normal horizon-viewing condition.

6. The holder of claim 5, wherein:

the linkage is geometrically arranged to point such optical aid, under manipulation by such user, at an angle that increases from zero to at least ten degrees as such user's head is tilted backward about fifty-five degrees from a normal horizon-viewing condition;

said angle being defined in relation to the "straight ahead" direction from such user's head;

whereby the viewing direction relative to the horizon increases from zero to at least sixty-five degrees as such user's head is tilted backward about fifty-five degrees from a normal horizon-viewing condition.

7. The holder of claim 1, for tracking the natural arc motion of a user's eye position in scanning upwardly from the horizon, and for use with such optical aid that has an eyepiece, wherein:

the linkage comprises arc-motion generating means that include at least one arm having two ends, one of the ends being pivotally secured to the base so that under manipulation by such user the other of the ends undergoes an arc motion; and the linkage also comprises means for conveying to the platform and to such eyepiece at least some part of the arc motion of said other end.

8. A personal optical-aid holder for supporting an optical aid in relation to the body of a user, during use and for tracking the natural arc motion of a user's eye position in scanning upwardly from the horizon, and for use with such optical aid that has an eyepiece, said apparatus comprising:

a base;

means for securing the base to such user's body;

a platform adapted to receive and hold such optical aid;

a mechanical linkage interconnecting the platform and the base, and:

positioning the platform in relation to the base, so as to substantially support such received and held optical aid in viewing positions substantially at such user's eyes, adapted for easy control by such user, without such user's raising his or her hands to the viewing positions of such optical aid, and geometrically arranged to translate and rotate such optical aid vertically, under manipulation by such user, to substantially follow movement of such user's head and eyes in scanning upwardly from the horizon, comprising arc-motion generating means that include at least one arm having two ends, one of the ends being pivotally secured to the base so that under manipulation by such user the other of the ends undergoes an arc motion, and also comprising means for conveying to the platform and to such eyepiece at least some part of the arc motion of said other end; and wherein:

the arc-motion generating means further include a second arm pivotally secured to the base, and a driving arm pivotally secured to the base-secured arms; the base, driving arm and base-secured arms forming a parallelogram; and the arc-motion conveying means include an extension of the driving arm beyond the parallelogram; the extension being pivotally secured to the platform at a pivot point on the platform.

9. The holder of claim 8, wherein:

the pivot point moves along a path that substantially duplicates the arc motion of said other end of said one arm, but displaced by the length of the extension, so that the arc motion of said other end is conveyed and imparted to the pivot point on the platform.

10. The holder of claim 9, wherein:

the arc-motion conveying means further include an extension of either of the base-secured arms beyond the parallelogram, and a control arm that is pivotally secured to the extension and to a second pivot point on the platform, to control the angle of the platform relative to the driving-arm extension.

11. The holder of claim 10, wherein:

the control arm is shorter than the driving-arm extension; and the distance between the two pivot points on the platform is shorter than the base-secured-arm extension.

12. The holder of claim 8, wherein:

the base-secured arms and the driving-arm extension are each roughly nine inches long; and the overall width of the holder is less than twelve inches.

13. The holder of claim 8, wherein:

the base-secured arms are both approximately 9.2 inches long;

the driving-arm extension is approximately 8.8 inches long; and the overall width of the holder is roughly five inches or less.

14. The holder of claim 10, wherein:

the base-secured arms are both approximately 9.2 inches long;

the driving-arm extension is approximately 8.8 inches long;

the control arm is approximately 8.3 inches long;

the base-secured arm extension is approximately 2.5 inches long; and the distance between the two pivot points on the platform is approximately 2.1 inches.

15. The holder of claim 1, wherein:

the linkage is also geometrically arranged to fold downwardly from a horizon-viewing position, carrying such optical aid into a storage position, under manipulation by such user.

16. The holder of claim 1, also comprising:

means for substantially bearing the combined weight of the platform, the linkage, and such optical aid when such aid is in the viewing positions.

17. The holder of claim 16, wherein:
the weight-bearing means comprise a biasing device such as a spring or a sealed gas cylinder.

18. The holder of claim 16, wherein:
the weight-bearing means comprise a counterbalance mechanism.

19. The holder of claim 1, wherein:
the base-securing means comprise a harness and a cushion;
the holder is substantially narrower than the user's shoulders; and
in use, substantially all of the holder except the harness is disposed in front of the user, and no part of the holder is adjacent to the user's head near the height of the user's eyes;
whereby the holder when in use generates in the user little or no sensation of confinement.

20. The holder of claim 19, wherein the harness includes:
first dual strap means for passing from the base over each of such user's shoulders to support at least part of the combined weight of the holder and such optical aid from such user's shoulders; and
second dual strap means for passing from the base around each of such user's sides and for respectively interconnecting with the first strap means to stabilize the first strap means.

* * * * *